United States Patent [19]

Eguchi et al.

[11] Patent Number: 5,009,489
[45] Date of Patent: Apr. 23, 1991

[54] LIQUID CRYSTAL DEVICE

[76] Inventors: Ken Eguchi; Haruki Kawada; Kunihiro Sakai; Yoshinori Tomida; Hiroshi Matsuda; Akira Tsuboyama; Kiyoshi Takimoto; Osamu Takamatsu, all c/o Canon Kabushiki Kaisha: 30-2, 3-chome, Shimomaruko, Ohta-ku, Tokyo, Japan

[21] Appl. No.: 376,940

[22] Filed: Jul. 7, 1989

Related U.S. Application Data

[63] Continuation of Ser. No. 33,191, Apr. 2, 1987, abandoned.

[30] Foreign Application Priority Data

| Apr. 4, 1986 | [JP] | Japan | 61-76704 |
| Apr. 8, 1986 | [JP] | Japan | 61-80808 |
| Jun. 11, 1986 | [JP] | Japan | 61-133776 |
| Jun. 11, 1986 | [JP] | Japan | 61-133777 |
| Jun. 11, 1986 | [JP] | Japan | 61-133778 |
| Jun. 11, 1986 | [JP] | Japan | 61-133779 |

[51] Int. Cl.⁵ .............................................. G02F 1/13
[52] U.S. Cl. .................................. 350/341; 350/339 R; 350/350 S
[58] Field of Search ............... 350/350 S, 339 R, 341; 526/285

[56] References Cited

U.S. PATENT DOCUMENTS

| 3,912,369 | 10/1975 | Kashnow | 350/341 |
| 4,367,924 | 1/1983 | Clark et al. | 350/350 S |
| 4,561,726 | 12/1985 | Goodby et al. | 350/341 |
| 4,562,141 | 12/1985 | Tieke | 526/285 |
| 4,618,514 | 10/1986 | McClelland et al. | 350/341 |
| 4,639,089 | 1/1987 | Okada et al. | 350/334 |
| 4,775,223 | 10/1988 | Yoshinaga et al. | 350/350 S |
| 4,796,979 | 1/1989 | Tsuboyama | 350/350 S |
| 4,882,085 | 11/1989 | Yoshinaga et al. | 350/350 S |
| 4,911,958 | 3/1990 | Mochizuki et al. | 350/341 |

FOREIGN PATENT DOCUMENTS

| 2604293 | 8/1977 | Fed. Rep. of Germany . | |
| 0045220 | 3/1985 | Japan | 350/339 R |

OTHER PUBLICATIONS

J. D. Swalen, "Optical Properties of Langmuir Blodgett Films", *Journal of Molecular Electronics*, vol. 2, 155-181 (1986).

C. W. Wilmsen and J. C. Robertson, "Vapor Techniques for the Formation of Organic Mondayer Tunnel Junctions", *Thin Solid Films*, vol. 29, No. 1, 185-192 (Sep. 1975).

*Primary Examiner*—Stanley D. Miller
*Assistant Examiner*—Anita Pellman Gross

[57] ABSTRACT

A liquid crystal device is provided which has a pair of substrates and a ferroelectric liquid crystal with the molecules thereof arranged in a plurality of layers perpendicular or nearly perpendicular to the surface of said pair of substrates. The device is characterized in that at least one of said pair of substrates is coated with a film of a polymeric material for aligning the plurality of layers preferentially in one direction, and the film of the polymeric material is formed of a monomecular film or a monomolecular built-up film of a polymeric compound having both a hydrophilic portion and a hydrophobic portion within a molecule.

11 Claims, 3 Drawing Sheets

LIQUID CRYSTAL DEVICE

This application is a continuation of application Ser. No. 033,191 filed Apr. 2, 1987, now abandoned.

BACKGROUND OF THE INVENTION

1. Field of the Invention

This invention relates to a liquid crystal device for a liquid crystal display device, a liquid crystal-optical shutter, etc., particularly a liquid crystal device by use of a ferroelectric liquid crystal, and more particularly to a liquid crystal device improved in display characteristics achieved by improvement of the initial aligning state of the liquid crystal molecules.

2. Related Background Art

A display device of the type which controls transmitted light in combination with a polarizing device by utilizing the refractive index anisotropy of ferroelectric liquid crystal molecules has been proposed by Clark and Lagerwall (Japanese Laid-open Patent Publication No. 107216/1981, U.S. Pat. No. 4,367,924). This ferroelectric liquid crystal has generally the chiral smectic C phase (SmC*) or H phase (SmH*) and, in this state, has the property of taking either one of the first optically stable state and the second optically stable state responding to the electrical field applied and maintaining such state in absence of application of electrical field, namely bistability, and it responds rapidly to the change in electrical field. Thus, it is expected to be useful for high-speed and memory-type display devices.

For an optical modulating device employing a liquid crystal exhibiting such bistability to give desirable driving characteristics, it is required that the liquid crystal held between a pair of parallel substrates should be in a state of a molecular arrangement so that transition between the above two stable states may effectively occur independently of the state of an applied electrical field. For example, as to a ferroelectric liquid crystal in a SmC* or SmH* phase, it is necessary to form a domain (monodomain) in which the liquid crystal molecule phase in an SmC* or SmH* phase is arranged perpendicularly to the substrate surface, and therefore the liquid crystal molecule axes are arranged in substantially parallel to the substrate surface.

Whereas, for aligning ferroelectric liquid crystal, there has been a method by use of an alignment control film treated for uniaxial aligning by way of rubbing treatment or oblique vapor deposition treatment.

Most of the conventional alignment methods have been used for ferroelectric liquid crystal having a helical structure exhibiting no bistability. For example, the alignment method disclosed in Japanese Laid-open Patent Publication No. 230635/1985 controls alignment of a ferroelectric liquid crystal by employing a polyimide film treated for rubbing in a state of a helical structure exhibiting no bistability.

However, when the alignment control film of the prior art as described above is applied to alignment control of a ferroelectric liquid crystal with a non-helical structure exhibiting bistability reported by Clark and Lagerwall, the problems as described below were involved.

The present inventors have found that the tilt angle (the angle shown in FIG. 3 as described below is smaller in the ferroelectric liquid crystal with a non-helical structure obtained by alignment with the alignment control film of the prior art as compared with the tilt angle $\Theta$ (which corresponds to ½ value of the apex angle of the cone shown in FIG. 2 as described below) in a ferroelectric liquid crystal having a helical structure. Particularly, the tilt angle $\eta$ in the ferroelectric liquid crystal with a non-helical structure obtained by alignment with the alignment control film of the prior art was found to be generally about 10°, and the transmittance therein was at most about 3 to 5%.

Thus, according to Clark and Lagerwall, the tilt angle in the ferroelectric liquid crystal of a non-helical structure realizing bistability may be expected to have the same angle a the tilt angle in the ferroelectric liquid crystal of a helical structure, but in fact the tilt angle $\theta$ in a non-helical structure is smaller than the tilt angle $\Theta$ in the helical structure. Besides, the cause for the smaller tilt angle $\theta$ in the non-helical structure $\Theta$ in the helical structure has been found to be attributable to the twisted arrangement of the liquid crystal molecules in the non-helical structure. In other words, in the ferroelectric liquid crystal having a non-helical structure, the liquid crystal molecules are arranged twistedly at a twist angle $\delta$ successively from the axis 42 of the liquid crystal molecule adjacent to the upper substrate to the axis 43 of the liquid crystal molecule adjacent to the lower substrate (in the direction of twisted arrangement 44) relative to the normal line of the substrate as shown in FIG. 4, and this is a cause for the tilt angle $\theta$ in a non-helical structure being smaller than the tilt angle $\Theta$ in the helical structure.

In the Figure, 41 represents uniaxial aligning axis obtained by the rubbing treatment or the oblique vapor deposition treatment on the upper and lower substrates.

Whereas, in a liquid crystal device utilizing birefringence of a liquid crystal, the transmittance through crossed Nicols may be represented as follows:

$$I/I_0 = \sin^2 4\theta \sin^2 \frac{\Delta nd}{\lambda} \pi$$

wherein $I_0$ is incident light intensity, I is transmitted light intensity, $\theta$ is a tilt angle, $\Delta n$ is a refractive index anisotropy, d is a film thickness of the liquid crystal layer and $\lambda$ is a wavelength of incident light.

The tilt angle 0 in a non-helical structure as described above appears as the angle in the average molecular axis direction of the liquid crystal molecules with twisted arrangement under the first and the second alignment states. According to the above formula, transmittance reaches the maximum at the tilt angle of 22.5°, but the tilt angle $\theta$ in a non-helical structure realizing bistability is at most about 10°, and therefore there is involved the problem that its transmittance is as small as about 3 to 5% and is unsatisfactory when application to a display device is considered.

SUMMARY OF THE INVENTION

An object of the present invention is to solve the problems as described above, namely to provide a liquid crystal device giving improved transmittance at an open state of a shutter of a picture element by increasing the tilt angle in a ferroelectric liquid crystal with a non-helical structure realizing at least two stable states, particularly bistability.

It is also another object of the present invention to provide a liquid crystal device which employs an alignment control film suitable for formation of a monodomain of a ferroelectric liquid crystal.

According to an aspect of the present invention, there is provided a liquid crystal device provided with a pair of substrates and a ferroelectric liquid crystal with the molecules thereof arranged in a plurality of layers perpendicular or nearly perpendicular to the surface of said pair of substrates, characterized in that at least one of said pair of substrates is coated with a film of a polymeric material for aligning said plurality of layers preferentially in one direction, and the film of the polymeric material is formed of a monomolecular film or a monomolecular built-up film of a polymeric compound having both a hydrophilic portion and a hydrophobic portion within a molecule.

According to another aspect of the present invention, there is provided a liquid crystal device provided with a pair of substrates and a ferroelectric liquid crysta with the molecules thereof arranged in a plurality of layers perpendicular or nearly perpendicular to the surface of said pair of substrates, characterized in that at least one of said pair of substrates is coated with a film of a polymeric material for aligning said plurality of layers preferentially in one direction, and the film of the polymeric material is formed of a monomolecular film or a monomolecular built-up film of a polymeric compound having both a hydrophilic portion and a hydrophobic portion within a molecule, and further the surface of said substrate is subjected to an alignment treatment for aligning said monomolecular film or monomolecular built-up film preferentially in one direction.

According to still another aspect of the present invention, there is provided a liquid crystal device provided with a pair of substrates and a ferroelectric liquid crystal with the molecules thereof arranged in a plurality of layers perpendicular or nearly perpendicular to the surface of said pair of parallel substrates, characterized in that at least one of said pair of substrates is coated with a film of a polymeric material for aligning said plurality of layers preferentially in one direction, and said film of the polymeric material is provided by forming a monomolecular film or monomolecular built-up film of a monomer having both a hydrophilic portion and a hydrophobic portion within a molecule, and polymerizing the monomer.

According to a further aspect of the present invention, there is provided a liquid crystal device provided with a pair of substrates and a ferroelectric liquid crystal with the molecules thereof arranged in a plurality of layers perpendicular or nearly perpendicular to the face of said pair of substrates,characterized in that a least one of said pair of substrates is coated with a film of an organic material for aligning said plurality of layers preferentially in one direction and said film of organic material is provided by forming a monomolecular film or monomolecular built-up film of a monomer having both a hydrophilic portion and a hydrophobic portion within a molecule, polymerizing the monomer into a polymer, and subjecting the polymer to patterning.

According to a still further aspect of the present invention, there is provided a liquid crystal device provided with a pair of substrates and a ferroelectric liquid crystal with the molecules thereof arranged in a plurality of layers perpendicular or nearly perpendicular to the face of said pair of substrates, characterized in that at least one of said pair of substrates is coated with a film of a polymeric material for aligning said plurality of layers preferentially in one direction, and said organic film is provided by forming a monomolecular film or monomolecular built-up film of a monomer having both a hydrophilic portion and a hydrophobic portion within a molecule, polymerizing the monomer into a polymer, and subjecting the polymer to rubbing treatment for aligning said plurality of layers preferentially in one direction on the surface of at least one of the substrates.

According to a still further aspect of the present invention, there is provided a liquid crystal device provided with a pair of substrates and a ferroelectric liquid crystal with the molecules thereof arranged in a plurality of layers perpendicular or nearly perpendicular to the face of said pair of substrates, characterized in that at least one of said pair of substrates is coated with a film of a polymeric material for aligning said plurality of layers preferentially in one direction, and said organic film is provided by forming a monomolecular film or monomolecular built-up film of a monomer having both a hydrophilic portion and a hydrophobic portion within a molecule, polymerizing the monomer into a polymer, and providing grooves on the surface of at least one of the substrates to align said plurality of layers preferentially in one direction.

DETAILED DESCRIPTION OF THE PREFERRED EMBODIMENTS

Figure 1:
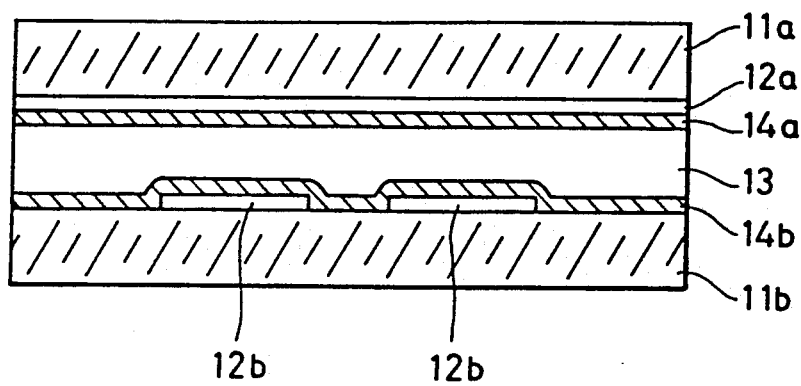
FIG. 1 is a sectional view showing an embodiment of the liquid crystal device of the present invention.

FIG. 1 is a sectional view showing a embodiment of the liquid crystal device of the present invention. The liquid crystal device shown in FIG. 1 has a pair of an upper substrate 11a and a lower substrate 11b arranged in parallel and transparent electrodes 12a and 12b wired on the respective substrates. Between the upper substrate 11a and the lower substrate 11b is arranged a ferroelectric liquid crystal, preferably a ferroelectric liquid crystal 13 with a non-helical structure having at least two stable states.

Each of the transparent electrodes 12a and 12b is wired in shape of a stripe for multiplexing drive of the ferroelectric liquid crystal 13, and the stripe shapes are preferably arranged in a fashion crossing each other.

In the liquid crystal device of the present invention, alignment control films 14a and 14b formed of a monomolecular film or a monomolecular built-up film of a polymeric compound are arranged on the substrates 11a and 11b, respectively.

Figure 6:
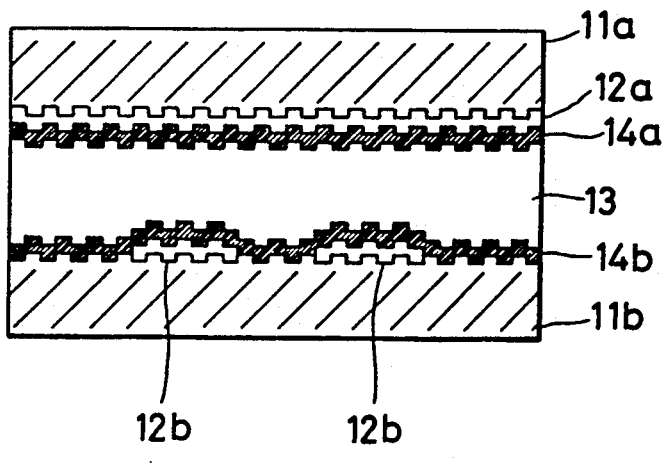
FIG. 6 is a sectional view representing another embodiment of the liquid crystal of the present invention.

FIG. 6 is a sectional view showing another embodiment of the liquid crystal device of the present invention. The liquid crystal device shown in FIG. 6 has a pair of an upper substrate 11a and a lower substrate 11b each having fine unevenness on the surface placed in parallel to each other, and transparent electrodes 12a and 12b wired on the respective substrates. Between the upper substrate 11a and the lower substrate 11b, there is arranged a ferroelectric liquid crystal, preferably a ferroelectric liquid crystal 13 with a non-helical structure exhibiting at least two stable states.

Each of the transparent electrodes 12a and 12b as mentioned above is wired in shape of a stripe for multiplexing drive of the ferroelectric liquid crystal 13, and the stripe shapes are preferably arranged in a passion crossing each other.

In another liquid crystal device of the present invention, the alignment control films 14a and 14b formed of a monomolecular film or a monomolecular built-up film of a polymeric compound are arranged on the substrates 11a and 11b, respectively.

The polymeric material constituting the monomolecular film or monomolecular built-up film of the present invention has both a hydrophobic portion and a hydrophilic portion in its molecule. Any polymeric compound having the portions in good balance in its higher order structure may be used for the present invention.

Generally speaking, typical examples of the constituent element of the hydrophobic portion are alkyl groups or unsaturated hydrocarbon groups, and both straight chain and branched chain compounds can be used. Further, hydrophobic groups, such as phenyl, fused polycyclic phenyl groups such as naphthyl, anthranyl, etc., chain polycyclic phenyl groups such as biphenyl, terphenyl, etc., may be employed. These may be used individually or a plural number thereof may be combined to constitute the hydrophobic portion of the above molecule.

On the other hand, the most typical examples as the constituent element of the hydrophilic portion may include, for example, hydrophilic groups such as a carboxylic group and its metal salts and an amine salts, a sulfonic acid group and its metal salts and amine salts, a sulfonamide group, an amide group, an amino group, an imino group, a hydroxyl group, a quaternary amino group, an oxyamino group, an oxyimino group, a diazonium group, a guanidine group, a hydrazine group, a phosphoric acid group, a silicic acid group, an aluminic acid group, etc. These can be also used either indivicually or as a combination of a plural number thereof to constitute the hydrophilic portion of the above molecule.

Here, to have a hydrophilic portion and a hydrophobic portion in the molecule means, for example, to have both a hydrophilic group and a hydrophobic group as mentioned above within the molecule, or alternatively with more than one hydrophilic groups and hydrophobic groups, that a certain portion in the constitution of the whole molecule is hydrophilic relative to another portion, while the latter portion is hydrophobic relative to the former portion.

In the polymeric material, since the hydrophobic groups and hydrophilic groups are not only arranged one-dimensionally, but also arranged with a secondary structure such as α-helix or β-sheet structure, etc., and further a high order structure such as steric structure, it is required that the hydrophobic groups and hydrophilic groups should be distributed in good balance as a high order structure. By aligning the molecules having these high order structures to a high orderliness, it may be expected that the alignment control function not found in the alignment control film of the prior art will be exhibited.

Examples of the polymeric compounds as described above constituting the monomolecular film o monomolecular built-up film in the present invention may include the polymers as shown below.

I. Polypeptide derivatives

As the synthetic polypeptide, there may be included polypeptides having molecular weights of 10,000 to 1,000,000, preferably 100,000 to 700,000 obtained b dehydrating polymerization of amino acids and derivatives thereof such as:
(1) poly-γ-methyl-L-gultamate (PMLG)
(2) poly-γ-benzyl-L-gultamate (PBLG)
(3) poly-ε-benzyloxycarbonyl-L-lysine (PBCL).
Further, as natural proteins, there may be included, for example, granular proteins such as:
(4) bacteriorhodopsin
(5) cytochrome C
(6) chymotrypsin
(7) bovine serum albumin
(8) trypsin

II. Maleic anhydride polymer derivatives

There may be employed, for example:
(9) poly-n-octadecylvinyl ether-maleic anhydride
(10) poly-octadecene-l-maleic anhydride
(11) polystyrene-maleic anhydride.
Those with molecular weights of 1,000 to 100,000 are preferred.

III. Polyamide acid derivatives

There may be included long chain alkylamine salts (e.g. a salt of $N(CH_3)_2-(CH_2)_n-CH_3$, $10 \leq n \leq 25$) of polyamide acids obtained by 1 : 1 dehydrating condensation of acid anhydrides such as 3,3',4,4'-diphenyltetracarboxylic acid (12), pyromellitic acid (13), etc., with diamino compounds such as p-phenylenediamine (14), 4,4'-diaminodiphenyl (15) and 4,4'-diaminoterphenyl (16), 4,4'-diaminodiphenyl ether (17), etc.

The monomolecular films of these polyamide acids turn to polyimide monomolecular films by acid and heat treatment, and the polyimide films are used as the alignment control film.

As the polymeric material in the present invention, it is possible to use a polymeric compound by polymerization of a monomer having hydrophilic portion and a hydrophobic portion in combination in the same molecule which is formed into a monomolecular film or a monomolecular built-up film.

Typical examples of the constituent elements of the polymerizable site may include unsaturated hydrocarbon groups having at least one of vinylene, vinylidene, acetylene groups, etc., which may be either straight or branched.

These polymerizable sites exhibit hydrophobic property, and other groups constituting the hydrophobic portion may include, for example, phenyl; fused polycyclic phenyl groups such as naphthyl, anthranyl, etc.; and chain polycyclic phenyl groups such as biphenyl, terphenyl, etc. These may be used either individually or as a combination of plural kinds to constitute the hydrophobic portion of the above molecule.

On the other hand, the most typical examples of the constituent elements of the hydrophilic portion are as described above, including, for example, hydrophilic groups such as a carboxylic group and its metal salt and amine salt, a sulfonic acid group and its metal salt and amine salt, a sulfonamide group, an amide group, an amino group, an imino group, a hydroxyl group, a quaternary amino group, an oxyamino group, an oxyimino group, a diazonium group, a guanidine group, a hydrazine group, a phosphoric acid group, a silicic acid group, an aluminic acid group, etc.

These may be also used either individually or in combination to constitute the hydrophilic portion of the above molecules.

Here, to have a hydrophilic portion and a hydrophobic portion in the molecule means, for example, that the molecule has a hydropholic group and a hydrophobic group as described above, or alternatively with more than one hydrophilic groups and hydrophobic groups in the molecule, that a portion in the constitution of the whole molecule is hydrophilic in relative to another portion, while the latter portion is hydrophobic relative to the former portion.

Examples of the molecules constituting the monomolecular film or monomolecular built-up film as mentioned above may include the molecules represented by the following formulae (I), (II):

(I)

wherein X is COO, CONH, or OCO; $R_1$ is $CH_3$—, $CH_2=CH$—; $R_2$ is H, —$CH=CH_2$, —$C(CH_3)=CH_2$, or —$CH_2CH=CH_2$; and $10 \leq n \leq 25$

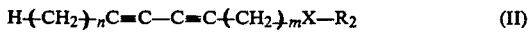
(II)

wherein X is COO, CONH, or OCO; $R_2$ is H, —$CH=CH_2$, —$C(CH_3)=CH_2$, or —$CH_2CH=CH_2; 0 \leq m,n$; and $10 \leq m+n \leq 25$.

The outline of the method for preparation of the monomolecular film or monomolecular built-up film in the present invention is explained referring to an example employing the film forming device of the Langumir-Blodgett method which is invented by the research group of Kuhn. In this example, water is used as the liquid for spreading the monomolecular film.

First, the molecules as mentioned above as the film forming molecule are dissolved in a volatile solvent such as benzene, chloroform, etc.

This solution is added dropwise by means of a syringe, etc., into a trough containing water, to spread a monomolecular film of said film-forming molecules on the aqueous phase. Subsequently by moving a buoy (or partitioning plate) provided for controlling expansion of the monomolecular film by free diffusion on the aqueous phase is moved to reduce the spreading area of the monomolecular film to apply a surface pressure on the monomolecular film until the monomolecular film becomes a state of a two-dimensional solid film. With this surface pressure maintained, the substrate is moved upward and downward gently vertically to and transversing the water surface, thereby transferring the monomolecular film onto the substrate. The mono molecular film can be produced according to the above procedure, and a monomolecular built-up film is formed by repeating the above operation of the upward and downward movement to a desired built-up number.

Shown above is the preparation of a monomolecular film or a monomolecular built-up film by means of the film forming device of Kuhn. The device for preparing the monomolecular film or monomolecular built-up film in the present invention, however, is not limited to the above example, but other film forming devices based on the principle of the Langmuir-Blodgett technique such as a horizontal lifting method or a cylinder rotatory method, etc., can be widely used.

Since the monomolecular film or monomolecular built-up film thus formed on a substrate has high density as well as high orderliness, it can be subjected successfully to patterning to, for example, a stripe shape having lines and spaces provided with pitches of constant intervals according to a suitable method such as irradiation of a UV-ray or an X-ray, etc., to polymerize the monomer, whereby a thin and uniform coated film of a polymeric material can be formed.

These alignment control films can also be endowed with the function as an insulating film, and they are generally formed in a thickness about 50 Å to 1 $\mu$, preferably 100Å to 1000 Å.

The monomolecular film or monomolecular built-up film of a polymeric compound thus formed on the substrate has been known to exhibit an invariable orientation characteristic of the film forming molecules in the direction in which the substrate is drawn up. Accordingly, said monomolecular film or monomolecular built-up film of the polymeric compound the uniaxial orientation control effect in its dipping direction.

Further, when an external factor is given during transfer of the monomolecular film spread on the liquid surface onto the substrate as described above, the arrangement or alignment of the film constituting molecules after built-up can be further enhanced. It becomes possible to improve the uniaxial alignment control function. The external factor is specifically the shape of the substrate surface (unevenness), and it can be obtained in the present invention by use of a substrate having grooves, particularly a substrate having grooves with pitches of about 0.1 $\mu$m to 10 $\mu$m, preferably 0.1 $\mu$m to 1 $\mu$m or a substrate applied with rubbing in a certain direction.

By enhancing remarkably the arrangement of the constituting molecules of the monomolecular film or the monomolecular built-up film, the alignment control films 14a and 14b applied with the monoaxial alignment treatment can be obtained. In the present invention, grooves can be formed by dry etching of the glass substrate surface according to the known lithographic technique. By sputtering of ITO electrodes onto said grooves, a transparent electrode substrate is formed. However, it is also possible to use a transparent electrode substrate which is prepared by first forming ITO electrodes on the glass substrate before formation of grooves of an organic resist or $SiO_2$ on said electrode substrate surface. The shape of said grooves may be preferably those with sharp edges and having the depth of grooves of about 20 Å to 2000 Å, preferably 100 Å to 1000 Å.

Next, a ferroelectric liquid crystal having an arrangement of molecules in a plurality of layers perpendicular to the face of a pair of parallel substrates to be used in the liquid crystal device of the present invention is to be explained.

Figure 2:
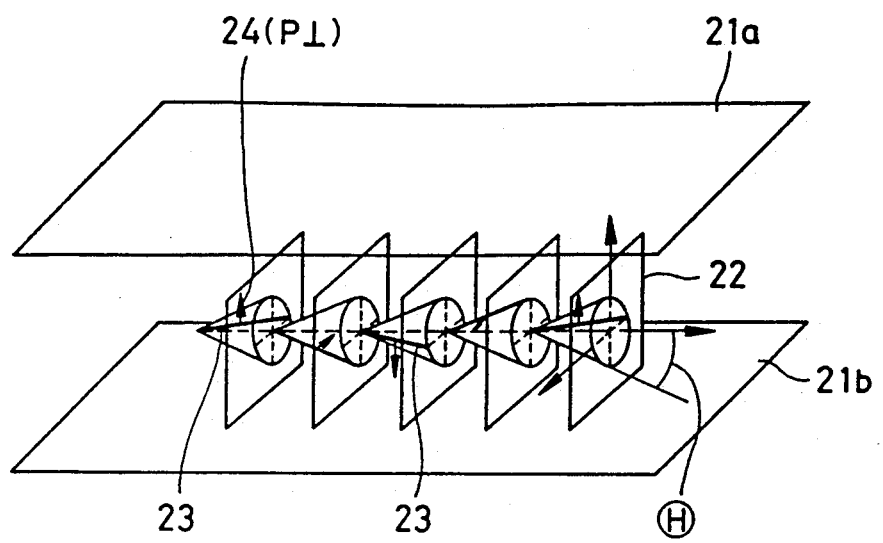
FIG. 2 is a perspective view showing schematically the liquid crystal device by use of a ferroelectric liquid crystal with a helical structure.

FIG. 2 illustrates schematically an example of a ferroelectric liquid crystal cell by use of a helical structure. 21a and 21b are substrates (glass plates) coated with transparent electrodes of $In_2O_3$, $SnO_2$ or ITO (Indium Tin Oxide), etc., and a liquid crystal of SmC* (chiral smectic C phase ) is sealed therebetween which is aligned so that a plurality of liquid crystal molecular layers 22 may become perpendicular to the glass substrate face. The bold lines 23 show liquid crystal molecules, which liquid crystal molecules 23 have a dipole moment (P⊥) 24. The angle forming the apex angle of the cone at this time represents the tilt angle θ in the chiral smectic phase of such a helical structure. When a voltage of a certain threshold value or higher is applied between the electrodes on the substrates 21a and 21b, the helical structure of the liquid crystal molecules 23 can be loosened to cause the change of the alignment direction of the liquid crystal molecules 23 so that all the dipole moments (P⊥) 24 may be directed in the electrical field direction.

However, the ferroelectric liquid crystal by use of the helical structure will return to the original helical structure during no application of electrical field, and it does not exhibit bistability as described below.

Figure 3:
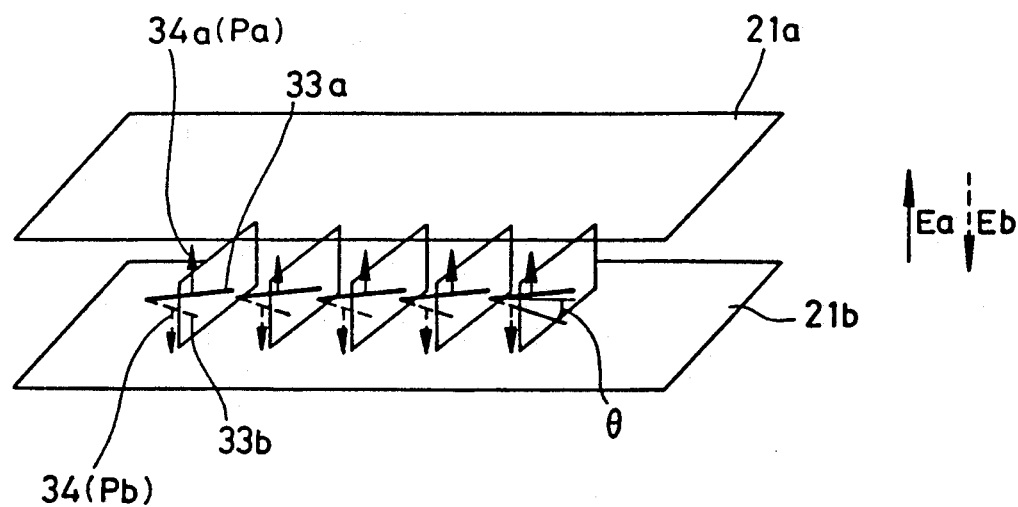
FIG. 3 is a perspective view showing schematically the liquid crystal device by use of a ferroelectric liquid crystal with a non-helical structure.

In a preferable example of the present invention, it is possible to use a ferroelectric liquid crystal device having at least two stable states in absence of electrical field, particularly having the bistable state as shown in FIG. 3. That is, when the liquid crystal cell is made sufficiently thin (e.g. 1 μ), the helical structure of the liquid crystal molecules will be loosened even under the state with no application of electrical field to become a non-helical structure as shown in FIG. 3, whereby its dipole moment Pa or Pb takes either state directed upward (34a) or downward (34b), thus forming bistable state. When an electrical field Ea or Eb with different polarity of a certain threshold value or higher is applied to such a cell as shown in FIG. 3, the dipole moment electrical field Ea or Eb will change its direction upwardly 34a or downwardly 34b corresponding to the electrical field vector, whereby correspondingly the liquid crystal molecules become aligned to either one of the first stable state 33a or the second stable state 33b. ½ of the angle formed between the first stable state and the second stable state corresponds to the tilt angle θ.

Use of such ferroelectric liquid crystal as the optical modulating device gives the two advantages. Firstly, the response speed is extremely high and secondly, the liquid crystal molecules exhibits bistability in the alignment. To describe about the second point,for example, by referring to FIG. 3, application of an electrical field Ea makes liquid crystal molecules aligned to the first stable state 33a, which state is stable even if the electrical field may be removed. On the other hand, when an electrical field Eb in the reverse direction is applied, the liquid crystal molecules are aligned to the second stable state 33b to change the directions of the molecules, which state also remains even when the electrical field is removed. For such high response speed and memory effect through bistability to be realized effectively, the cell should be preferably as thin as possible, generally 0.5 μ to 20 μ, particularly suitably 1 μto 5 μ. A liquid crystal-electrooptical device having a matrix electrode structure by use of this kind of ferroelectric liquid crystal is proposed by, for example, Clark and Regaval in U.S. Pat. No. 4,367,924.

Example of the ferroelectric liquid crystals which can be used in the liquid crystal device of the present invention may include p-decyloxybenzylidene-p'-amino-2-methylbutylcinnamate (DOBAMBC), p-hexyloxybenzylidene-p'-amino-2-chloropropyl-cinnamate (HOBACPC), p-decyloxybenzylidene-p'-amino-2-methylbutyl-α-cyanocinnamate (DOBAMBCC), p-tetradecyloxybenzylidene-p'-amino-2-methylbutyl-α-cyanocinnamate (TDOBAMBCC), p-octyloxybenzylidene-p'-amino-2-methylbutyl-α-chlorocinnamate (OOBAMBCC), p-octyloxybenzylidene-p'-amino-2-methyl-butyl-α-methylcinnamate, 4,4'-azoxycinnamic acid-bis(2-methylbutyl) ester, 4-o-(2-methyl)-butylresorcylidene-4'-octylaniline, 4-(2'-methyl-butyl)phenyl-4'-octyloxybiphenyl-4-carboxylate, 4-hexyloxyphenyl-4-(2''-methylbutyl)biphenyl-4'-carboxylate, 4-octyloxyphenyl-4-(2''-methylbutyl)biphenyl-4'-carboxylate, 4-heptylphenyl-4-(4''-methylhexyl) bisphenyl-4'-carboxylate, 4-(2''-methylbutyl)phenyl-4-(4''-methylhexyl)biphenyl-4'-carboxylate, etc. These can be used either alone or in combination of two or more, and it is also possible to incorporate other cholesteric liquid crystals or smectic liquid crystals within the range exhibiting ferroelectric property.

In the present invention, chiral smectic phase can also be used for the ferroelectric liquid crystal, typically chiral smectic C phase (SmC*), H phase (SmH*), I phase (SmI*), K phase (SmK*) or G phase (SmG*).

Figure 5:
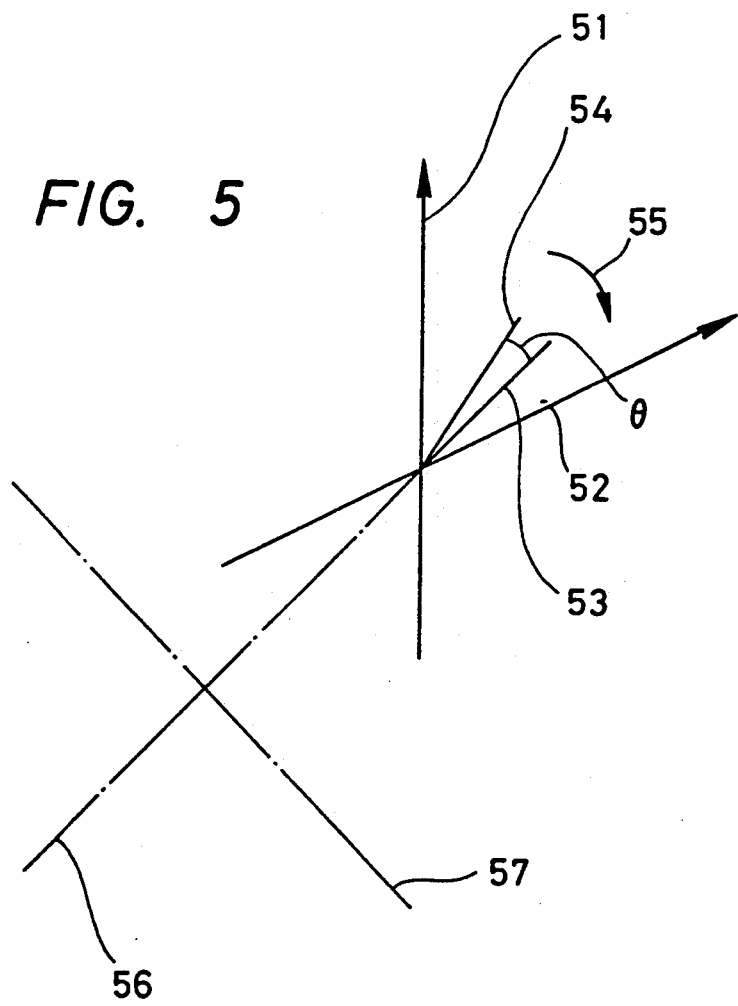
FIG. 5 is a diagram for illustration of the relationship of the uniaxial aligning axis and the axis of liquid crystal molecule used in the liquid crystal device of the present invention.

In the present invention, the uniaxial orientation axis such as the rubbing axes of the alignment control films 14a and 14b as described above can be made parallel to or crossed with each other, and it is particularly preferable to have the uniaxial orientation axes crossed as shown in FIG. 5.

Figure 4:
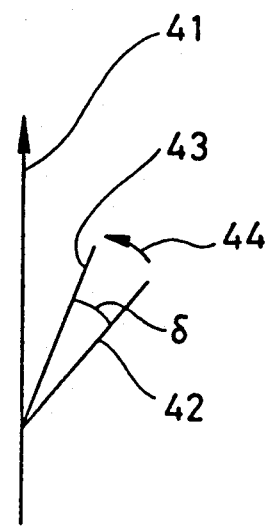
FIG. 4 is a diagram for illustration of the relationship between the uniaxial aligning axis of a substrate and the axis of ferroelectric liquid crystal molecule with a non-helical structure.

More specifically, as shown in FIG. 5, at the surfaces treated for uniaxial aligning on the upper and lower substrates, the respective uniaxial orientation axes 51 and 52 in absence of electrical field are crossed at an angle in the opposite direction 55 to the direction 44 of the twisted arrangement shown in FIG. 4. When the chiral smectic phase is aligned by lowering the temperature from the phase on the higher temperature side than said phase in the presence of such surface treated for uniaxial alignment, the axis 53 of the liquid crystal molecules adjacent to the upper and lower substrates become parallel to each other. In this chiral smectic phase, the liquid crystal molecules are angle θ (or −θ) from the axis 54 of the liquid crystal molecule in the smectic A phase (SmA) aligned with in angle between the uniaxial orientation axes 51 and 52, whereby a first and a second stable states can be formed (the first stable state when the title angle is θ, and the second stable state when the tilt angle is −θ).

In this liquid crystal device, the maximum contrast can be obtained when one polarizing axis 56 of the crossed Nicols is made parallel to the axis 53 of the liquid crystal molecule corresponding to the molecule axis direction in the first stable state, while the other polarizing axis 57 is crossed at right angle with the polarizing axis 56.

In a preferable example of the present invention, the tilt angle θ as described above can be increased to the tilt angle Θ in the helical structure or to an angle approximate thereto, by the alternate current application pre-treatment. This tilt angle is called θ'. For the alternate current used in this case, a voltage of 20 to 500 V, preferably 30 to 150 V under frequency of 10 to 500 Hz, preferably 10 to 200 Hz can be used, and the alternate current application pretreatment can be applied for an application time of several seconds to about 10 minutes. Also, such alternate current application pretreatment may be practiced at the stage before performing writing corresponding, for example, to picture signals or information signals in a liquid crystal device. Preferably, the above mentioned alternate current application pretreatment ma be practiced during the wait time when such a liquid crystal device is assembled in an apparatus and such apparatus is operated, or alternatively the alternate current application pretreatment can be applied also during manufacturing of such a liquid crystal device.

When such alternate current application pretreatment is effected, namely when an alternate current electrical field is applied on the ferroelectric liquid crystal device having bistable state as shown in FIG. 4 or FIG. 5 in the experiment conduct by the present inventors, the tilt angle $\theta$ before application can be increased to an angle $\theta'$ approximate to the tilt angle $\Theta$ in the helical structure, and yet the increased tilt angle $\theta'$ can be maintained even after such alternate current application is removed.

Also, such alternate current application pretreatment is effective for a ferroelectric liquid crystal exhibiting great spontaneous polarization (e.g. 5 nc/cm$^2$ or more, preferably 10 nc/cm$^2$–300 nc/cm$^2$ at 25° C; nc is a unit representing nanocoulomb). This spontaneous polarization can be measured with a 100 $\mu$ cell according to the triangular wave application method, which is reported by K. Miyasato et al: "Direct Method with Triangular Waves for Measuring Spontaneous Polarization in Ferroelectric Liquid Crystal", Japanese Journal of Applied Physics, VOl. 22(10), p. 661–663 (1983).

In the present invention, one of the two the alignment control films 14a and 14b as described above may be omitted. Also, in another example of the present invention, of the alignment control films 14a and 14b as described above, one of the alignment control films can be made another different alignment control film. As the coated film for forming the another alignment control film, there may be employed, for example, coated films of polyvinyl alcohol, polyamide, polyester, polyimide, polyamidoimide, polyester imide, etc. It is also possible to use one formed by a method of effecting oblique deposition of an inorganic material such as SiO or SiO$_2$ as the another alignment control film.

The present invention is described below by referring to specific Examples and Comparative example.

EXAMPLE 1-1

Two 0.7 mm thick glass plates were prepared and an ITO electrode of 1000 Å was formed on each glass Then, a poly-$\gamma$-benzyl-L-glutamate (PBLG #2, molecular weight 640,000) which is a synthetic polypeptide was dissolved in methylene chloride (concentration 1 mg/ml), and the solution was spread on pure water of a temperature of 17° C. (conductivity 0.03 $\mu$s/cm).

After evaporation of methylene chloride of the solvent, the surface pressure was enhanced to 5 dyn/cm to form a monomolecular film of one layer on the water surface. After the film was left to stand for 1.5 hours at a surface pressure maintained at 5 dyn/cm, the above ITO substrate was moved up and down gently at a speed of 2.5 mm/min. in the direction transversing the water surface to build up 20 layers.

Under the built-up conditions, PBLG was built-up only when the substrate was drawn up, whereby a Z-type monomolecular built-up film (film thickness: about 220 Å) was obtained.

The monomolecular built-up film of PBLG was further applied with the rubbing treatment with a cloth in the direction parallel to the dipping direction to give an alignment control film. The two glass substrates were assembled in a cell so that the rubbing axes in the respective alignment control films became in parallel to each other.

The cell thickness (the gap between upper and lower substrates) was held with a photoresist spacer formed beforehand on the lower substrate.

After vacuum injection of a mixed liquid crystal as described below under isotropic phase into this liquid crystal cell (this is called 1.8 $\mu$m cell), the liquid crystal could be aligned by leaving it to cool state of an isotropic phase at 0.5° C/h to a temperature of 30° C. Subsequent experiments were conducted at 30° C.

Mixed liquid crystal

| | (weight ratio) |
|---|---|
| $C_8H_{17}O$—⟨○⟩—COO—⟨○⟩—OCH$_2$$\overset{*}{C}$H—C$_2$H$_5$ <br>                                                              CH$_3$ | 2 |
| $C_8H_{17}O$—⟨○⟩—OCO—⟨○⟩—⟨○⟩—CH$_2$$\overset{*}{C}$H—C$_2$H$_5$ <br>                                                              CH$_3$ | 1 |
| $C_8H_{17}$—⟨○⟩—N=N—⟨○⟩—OCO—$\overset{*}{C}$HOC$_7$H$_{15}$ <br>                                                              CH$_3$ | 0.3 |

(temperature range of SmC*; 3–35° C.).

When the cell was observed under crossed Nicols, a monodomain having a chiral smectic C phase with a uniform and defectless non-helical structure formed therein was found to be obtained.

By applying a pulse electrical field (20 V; 500 $\mu$sec) on the liquid crystal cell to align the liquid crystal molecular directions to one stable state and the angle for the darkest state where the amount of transmitted light becomes the lowest is detected while rotating the liquid crystal cell under crossed Nicols, and subsequently by applying a pulse electrical field of the opposite polarity to the previous pulse ($-20$ V; 500 $\mu$sec) to transfer the liquid crystal molecules to another stable molecular alignment state to bring it to a light state, and thereafter an angle for the darkest state is again detected by rotating the liquid crystal cell. The positions for the two darkest states correspond to detection of stable average molecular axes of the liquid crystal, and the angle between the two states correspond to the tilt angle $2\theta$.

The tilt angle of the liquid crystal cell as described above was thus measured, and was found to be 14°. That is, the liquid crystal cell of this example exhibited its tilt angle which was greater not found in the prior art under the memory state which was realized in the bistable chiral smectic phase. The amount of transmitted light under the lightest state in this liquid crystal cell was found to be 12%. Measurement of the amount of transmitted light was practiced by means of a photomultiplier.

Next, the present inventors measured the twisted arrangement angle and its direction of the liquid molecules relative to the normal line direction of the substrate in the liquid crystal cell as described above. For this measurement, a liquid crystal cell (called 3.0 $\mu$m cell) was prepared according to entirely the same manner as above except for using 3.0 $\mu$m alimina beads as the spacer in place of the photoresist spacer of 1.8 $\mu$m used in the liquid crystal cell as previously described.

The twisted arrangement angle of the liquid crystal molecule was measured by rotating one of the analyzers from the crossed angle under the darkest state under crossed Nicols to change its crossed angle, finding the position which becomes further darker state and determining the angle rotated of one of the analyzers from the light angle. This angle corresponds to the twisted angle δ as mentioned above.

Accordingly, in the 3.0 μm cell as described above, defining the clockwise direction as positive (+) and the anticlockwise direction as negative (−) as observed from an observer, the dark state could be detected by rotating the analyzer from the crossed Nicols by 4–5° in the negative direction, and then rotating the liquid crystal cell. Also, the dark state could b similarly obtained by rotating the polarizer by 4–5° in the positive direction from the crossed Nicols. Therefore, it has been found that the liquid crystal molecules in this device are arranged twistedly in the positive direction, with the longer axis of the liquid crystal molecule existing on the adjacent surfaces of the upper and lower substrates being twisted with a twist angle δ of 4–5°.

EXAMPLE 1-2

Liquid crystal cells were prepared according to the same manner as in Example 1-1 except for using rubbing axes crossed at angles of 45° and 20° in the negative direction (−) in place of the parallel rubbing axes used in the 1.8 μm cell in Example 1-1.

When the tilt angles of these liquid cells were measured, each of them was found to be 14°. It has been found in these liquid crystal cells that although SmA exists on the higher temperature side of SmC*, the optical axis of SmA exists on the bisector of the angle formed by the crossed rubbing axes.

Subsequently, on the two kinds of liquid crystal cells as described above were respectively applied high electrical field alternate currents of a voltage of 70 volt and a frequency of 70 Hz for about 5 minutes (alternate current application pretreatment). The tilt angles θ' at this time were measured. The results are shown in the Table 1-1 shown below.

TABLE 1-1

| Crossing angle of rubbing axes | −45° | −20° |
|---|---|---|
| Tilt angle θ' | 14° | 14° |

For these two kinds of liquid crystal cells, the twisted angle δ shown in FIG. 4 was measured according to the same method as in measurement of the twisted angle δ in the liquid crystal device of the 3 μm cell as described above. As the results, in the liquid crystal devices by use of crossed rubbing axes with crossed angles of −45° and −20°, no twisted angle δ of liquid crystal molecule relative to the normal line of the upper and lower substrate was observed, but the molecular axes of the liquid crystal molecules adjacent to the upper and lower substrate were found to be parallel to each other. Besides, in the liquid crystal devices by use of crossed rubbing axes with crossed angles of −45° and −20°, the tilt angle θ' in Table 1-1 could be maintained even when the rectangular pulses for driving of +20 volt and −20 volt were continued to be applied alternately at 1 msec. This corresponds to the point that the maximum tilt angle θ' can be maintained even when the time division driving method as described in Japanese Laid-Open Patent Publication No. 193426/1984 or No. 19347/1984 may be applied to the liquid crystal device practically corresponding to picture signals or information signals Also, when transmittance at this time was measured, it was found to be about 18% in each case.

The direction of the twisted arrangement state having the twisted angle δ is determined from the interaction between the substrate and the liquid crystal around the interface therewith. That is, whether the polarizing direction of the liquid crystal molecules near the interface is directed inwardly or outwardly relative to the substrate is determined depending on the properties of the substrate, and the liquid crystal between the substrates is aligned forcibly with a twisted arrangement when the same alignment control film was used for both the upper and lower substrate.

When the direction of the twisted arrangement along the normal line of the substrate is the same as the deviated direction of the uniaxial aligning axis, the molecules near the interface of the substrate are aligned in the aligning axis direction of each substrate, whereby the twisted arrangement state is more stabilized to become a metastable alignment state under the state of the tilt angle θ' after the alternate current application pre-treatment as described above.

Under the state of the tilt angle θ' after the alternate current application pre-treatment as described above, polarization of the molecules near the interface is required to have an inwardly directed arrangement on one substrate, while an outwardly arrangement on the other substrate.

When the uniaxial orientation axis is deviated in the opposite direction to the twisted arrangement direction of liquid crystal, that is, when the uniaxial orientation axis is crossed at an angle in the opposite direction to the twisted arrangement direction, stabilization energy by the forcible anchoring with the uniaxial orientation axis is greater than the stabilization energy by the interaction between molecule polarization and the interface, and therefore a state having stable tilt angle θ' can be realized.

Therefore, in order to realize a ferroelectric liquid crystal device having high transmittance, it is necessary to cancel the twisted arrangement state and yet shift the uniaxial orientation axis from each other in the direction to stabilize the ideal arrangement state given by the alternate current application pretreatment. Its direction is opposite to the twisted arrangement direction of the liquid crystal having the twisted angle δ determined by the liquid crystal and the substrate interface.

EXAMPLE 1-3

A liquid cell was prepared according to entirely the same procedure as in Example 1-1 except for applying no rubbing treatment on the alignment control film used in preparation of the 1.8 μm cell in Example 1-1.

When the tilt angle θ and the transmittance in this liquid cell were measured according to the same methods as in Example 1-1, the tilt angle θ was tound to be 13° and the transmittance at that time was 11%.

EXAMPLES 1-4 to 1-8

Liquid crystal cells were prepared according to entirely the same procedure as in Example 1-1 except for using the monomolecular built-up films shown in Table 1-2 below subjected to rubbing treatment in place of the alignment control film used in the 1.8 μm cell in Example 1-1, and the tilt angle θ and the transmittance in each liquid crystal cell were measured according to the same methods as in Example 1-1. The results are shown in Table 1-2.

TABLE 1-2

| Example | Polymeric compound used in alignment control film | Tilt angle (θ) | Trans- mittance |
|---|---|---|---|
| 1-4 | (3) Poly-ε-benzyloxy-caronyl-L-lysine | 14° | 12% |
| 1-5 | (1) Poly-γ-methyl-L-glutamate | 14° | 11% |
| 1-6 | (7) Brovine serum albumin | 14° | 12% |
| 1-7 | (10) Poly-octadecene-1-maleic anhydride | 12° | 10% |
| 1-8 | Polyimide obtained by 1:1 dehydrating condensation of (12) 3,3',4,4'-diphenyl-tetracarboxylic acid and (14) p-phenylenediamine | 13° | 11% |

Note . . . No rubbing treatment applied in Examples 1-8.

EXAMPLE 2-1

Two 0.7 mm thick glass plates were prepared and each was washed by rubbing with a neutral detergent and subjected to heat treatment at 120° C. for 30 minutes. Then, the surface was treated by spin coating (2500 rpm, 30 sec) with a surface treatment agent HMDS [produced by Tokyo Chisso K.K.], and further subjected to heat treatment at 150° C. for 10 minutes.

On the glass substrate thus subjected to the surface treatment, RD-2000N-10 [produced by Hitachi Kasei K.K.] which is a negative resist agent was applied under the following conditions, followed by heat treatment at 80° C. for 20 minutes to form a resist film with a film thickness of 0.7 μm.

| First | 4000 rpm | 1 sec |
|---|---|---|
| Second | 3000 rpm | 40 sec |

This negative type resist was exposed to light by means of a deep UV exposure device, PLA-500S for a period of 2.5 counts to form a latent image of a mask pattern, and the latent image was developed by use of an exclusive developing solution at 23° C. for 80 seconds. Finally, by performing washing with pure water, drying and post-rinse for 60 seconds, a grating pattern having 1 μm pitches (L 0.5 μm;S 0.5 μm) was formed on the glass substrate surface.

With the use of the resist pattern formed as described above as the mask, grooves with groove depth of 500 Å (grating pattern) were etched on the glass substrate surface under the following conditions by means of a parallel flat plate type dry etching device.

| Etching gas | CF₄ |
|---|---|
| Flow rate | 10 SCCM |
| Pressure | 7 Pa |
| Power | 100 W |
| Etching rate | 250 Å/min |

In this example, pattern formation on the glass substrate surface was effected by use of the dry etching method, but it is also possible to use the lift-off method of the prior art such as EB vapor deposition of $SiO_2$, etc.

On the glass surface equipped with grooves thus prepared, ITO electrodes having a film thickness of 1000 Å were formed according to the lift-off method.

Except for forming ITO electrodes having a film thickness of 1000 Å on the glass surface as described above, the same experiments as in Example 1-1 were conducted. As the result, the tilt angle in the 1.8 μm cell was found to be 14°, and, the transmittance in the lightest state was 12%. The 3.0 μm cell, the

EXAMPLE 2-2

Liquid crystal cells were prepared according to the same method as in Example 2-1 except for using rubbing axes crossed at angles of 45° and 20° in the negative direction (−) in place of the parallel rubbing axes used in the 1.8 μm cell in Example 2-1.

The tilt angles of these liquid cells were measured, and each of them was found to be 14°. It has been found in these liquid crystal cells that although SmA exists on the higher temperature side of SmC*, the optical axis of SmA exists on the bisector of the angle formed by the crossed rubbing axes.

Subsequently, on the two kinds of liquid crystal cells as described above were respectively applied high electrical field alternate currents of a voltage of 70 volt and a frequency of 70 Hz for about 5 minutes (alternate current application pretreatment). The tilt angles θ' in this state were measured. The results are shown in the Table 2-1 shown below.

TABLE 2-1

| Crossing angle of rubbing axes | −45° | −20° |
|---|---|---|
| Tilt angle θ' | 14° | 14° |

For these two kinds of liquid crystal cells, the twisted angle δ shown in FIG. 4 was measured according to the same method as in measurement of the twisted angle δ in the liquid crystal device of the 3 μm cell as described above. As the result, in the liquid crystal devices by use of crossed rubbing axes with crossed angles of −45° and −20°, no twisted angle δ of liquid crystal molecule relative to the normal line of the upper and lower substrate was observed, but the liquid crystal molecule axes adjacent to the uppe and lower substrate were found to be parallel to each other. Besides, in the liquid crystal devices by use of crossed rubbing axes with crossed angles of −45° and −20°, the tilt angle θ in Table 2-1 could be maintained even when the rectangular pulses for driving of +20 volt and −20 volt were continued to be applied alternately at 1 msec. The transmittance was found to be about 17% in each case.

EXAMPLE 2-3

A liquid crystal cell was prepared according to the entirely the same procedure as in Example 2-1 except for using a transparent electrode substrate applied with rubbing treatment of ITO electrodes in place of the transparent electrode substrate equipped with grooves used in the 1.8 μm cell in Example 2-1.

When the tilt angle θ and the transmittance in this liquid crystal cell were measured according to the same methods as in Example 2-1, the tilt angle θ was found to be 12° and the transmittance at that time 9%.

EXAMPLES 2-4

In place of the transparent electrode substrate equipped with grooves used in the 1.8 μm cell in Example 2-1, a transparent electrode substrate prepared by forming a coated film with a 3.5% by weight of N-methyl-2-pyrrolidone solution of a polyamic acid obtained by dehydrating condensation reaction of 3,3', 4,4'-diphenyltetracarboxylic anhydride and p-phenylenediamine in 1 : 1 molar ratio, followed by dehydrating ring closure to form a polyimide coated film and applying rubbing treatment on the polyimide coated film was used, and following otherwise the same procedure as in Example 2-1, two layers of PBLG were built up. And, according to entirely the same procedure as in Example 2-1, a liquid crystal cell was prepared. The tilt were measured according to the same method as in Example 2-1, and the tilt angle $\theta$ was found to be 13° and the transmittance 10%.

EXAMPLE 2-5 to 2-9

Liquid crystals were prepared according to entirely the same procedure as in Example 2-1, except for using the monomolecular built-up films of polymeric compounds shown below in Table 2-2 in place of the alignment control film used in the 1.8 μm cell in Example 2-1, and then the tilt angle $\theta$ and the transmittance in each liquid crystal cell were measured. The results are shown in Table 2-2.

TABLE 2-2

| Example | Polymeric compound used in alignment control film | Tilt angle ($\theta$) | Transmittance |
|---|---|---|---|
| 2-5 | (3) Poly-ε-benzyloxycarbonyl-L-lysine | 14° | 12% |
| 2-6 | (1) Poly-γ-methyl-L-glutamate | 13° | 12% |
| 2-7 | (7) Bovine serum albumin | 14° | 11% |
| 2-8 | (10) Poly-octadecene-1-maleic anhydride | 12° | 11% |
| 2-9 | Polyimide obtained by 1:1 dehydrating condensation of (12) 3,3',4,4'-diphenyl-tetracarboxylic acid and (14) p-phenylenediamine | 12° | 11% |

EXAMPLE 3-1

Two 0.7 mm thick glass plates were prepared, and ITO film of 1000 Å was formed on each glass plate.

A solution of ω-tricosenic acid in chloroform (concentration 1 mg/ml) was spread over and aqueous $CdCl_2$ solution (concentration: $4 \times 10^{-4}$ mol/liter, water temperature 20° C.) adjusted to pH 6.8 with KHCO.

After evaporation of chloroform of the solvent, the surface pressure was enhanced to 30 dyn/cm to form a monomolecular film. While the surface pressure was maintained constant, the above ITO substrate was moved upward and downward gently in the direction transversing the water surface at a speed of 20 mm/min to build up 10 layers.

The substrate having thus formed a polymerizable monomolecular built-up film thereon was applied with polymerization treatment by exposure in a X-ray irradiation device for X-ray lithography (Rh Lc line, line source-substrate distance: 10 cm, incident X-ray: 20 mJ/cm² min) for 1 minute. The monomolecular built-film thickness of about 250 Å. The coated film was subjected to rubbing treatment with cloth, and the two glass substrates were assembled in a cell so that the rubbing axes in the respective alignment control films became in parallel to each other.

The cell thickness (the gap between upper and lower substrates) was held with a photoresist spacer formed beforehand on the lower substrate.

Into this liquid crystal cell (called the 1.8 μm cell) was injected the same mixed liquid crystal as used in Example 1-1, and the same experiments were subsequently conducted. As the result, the tilt angle in the 1.8 um cell was found to be 13°, with the transmitted light quantity in the lightest state being 11 to 12%. Also, the twist angle δ in the 3.0 μm cell was 4 to 6°.

EXAMPLE 3-2

Liquid crystal cells were prepared according to the same method as in Example 3-1 except for using rubbing axes crossed at angles of 45° and 20° in the negative direction (−) in place of the parallel rubbing axes used in the 1.8 μm cell in Example 3-1.

When the tilt angles of these liquid cells were measured, each of them was found to be 14°. It has been found in these liquid crystal cells that although SmA exists on the higher temperature side of SmC*, the optical axis of SmA exists on the bisector of the angle formed by the crossed rubbing axes.

Subsequently, on the two kinds of liquid crystal cells as described above were respectively applied high electrical field alternate currents of a voltage of 70 volt and a frequency of 70 Hz for about 5 minutes (alternate current application pre-treatment). The tilt angles $\theta'$ were then measured. The results are shown in the Table 3-1 shown below.

TABLE 3-1

| Crossing angle of rubbing axes | −45° | −20° |
|---|---|---|
| Tilt angle $\theta'$ | 14° | 14° |

For these two kinds of liquid crystal cells, the twisted angle δ shown in FIG. 4 was measured according to the same method as in measurement of the twisted angle δ in the liquid crystal device of the 3 μm cell as described above. As the results, in the liquid crystal devices by use of crossed rubbing axes with crossing angles of −45° and −20°, no twist angle δ of liquid crystal molecule line of the upper and lower substrate was observed, but the liquid crystal molecule axes adjacent to the upper and lower substrate were found to be parallel to each other. Besides, in the liquid crystal devices by use of crossed rubbing axes with crossed angles of −45° and −20°, the tilt angle $\theta'$ in Table 3-1 could be maintained even when the rectangular pulses for driving of +20 volt and −20 volt were continued to be applied alternately at 1 msec. Also, when transmittance at this time was measured, it was found to be about 14% in each case.

EXAMPLE 3-3 to 3-6

Liquid crystals were prepared according to entirely the same procedure as in Example 3-1, except for using the coated films subjected to rubbing treatment shown below in Table 3-2 in place of the alignment control film used in the 1.8 μm cell in Example 3-1, and then the tilt angle $\theta$ and the transmittance in each liquid crystal cell were measured. The results are shown in Table 3-2.

TABLE 3-2

| Example | Coated films used in alignment control film | Tilt angle ($\theta$) | Transmittance |
|---|---|---|---|
| 3-3 | $CH_2=CH(CH_2)_{20}COOCH_2CH=CH_2$ | 13° | 11% |
| 3-4 | $CH_2=CH(CH_2)_{20}OCOC(CH_3)=CH_2$ | 13° | 11% |

TABLE 3-2-continued

| Example | Coated films used in alignment control film | Tilt angle ($\theta$) | Transmittance |
|---|---|---|---|
| 3-5 | $CH_3(CH_2)_{11}C\equiv C-C\equiv C(CH_2)_8COOH$ | 10° | 9% |
| 3-6 | $CH_3(CH_2)_{11}C\equiv C-C\equiv C(CH_2)_8OCOC(CH_3)=CH_2$ | 11° | 10% |

EXAMPLE 4-1

In the same manner as in Example 3-1, ω-tricosenic acid was dissolved in chloroform and a polymerizable monomolecular built-up film was formed.

The substrate having thus formed a polymerizable monomolecular built-up film was placed in an X-ray irradiation device for X-ray lithography (Rh Le line, line source-substrate distance: 10 cm, incident X-ray: 20 mJ/cm². min) and exposure was effected for one minute to form a polymerized pattern of lines and spaces having pitchs of 1 μm. The two sheets of glass substrates were assembled in a cell so that the directions of the polymerized patterns in the respective alignment control films became in parallel to each other.

The cell thickness (gap between upper and lower substrates) was held with a photoresist spacer formed beforehand on the lower substrate.

Into this liquid crystal cell wa injected the same mixed liquid crystal as used in Example 1-1, and the same experiments were subsequently conducted. As the result, the tilt angle in the 1.8 μm cell was found to be 14°, with the transmitted light quantity in the lightest state being 12%. Also, the twist angle δ in the 3.0 μm cell was 4 to 5°.

EXAMPLE 4-2

Liquid crystal cells were prepared according to the same method as in Example 4-1 except for using polymerized pattern axes crossed at angles of 45° and 20° in the negative direction (−) were used in place of the 1.8 μm cell used in Example 4-1 in which the polymerized pattern directions of the upper and lower alignment films were in parallel to each other.

The tilt angles of these liquid cells was found to be 14° each. It has been found in these liquid crystal cells that although SmA exists on the higher temperature side of SmC*, the optical axis of SmA exists on the bisector of the angle formed by the crossed rubbing axis.

Subsequently, on the two kinds of liquid crystal cells as described above were respectively applied high electrical field alternate currents of a voltage of 70 volt and a frequency of 70 Hz for about 5 minutes (alternate current application pretreatment). The tilt angles $\theta'$ were measured. The results are shown in the Table 4-1 shown below.

TABLE 4-1

| Crossing angle of rubbing axes | −45° | −20° |
|---|---|---|
| Tilt angle $\theta'$ | 14° | 14° |

For these two kinds of liquid crystal cells the twisted angle δ shown in FIG. 4 was measured according to the same method as in measurement of the twist angle δ in the liquid crystal device of the 3 μm cell as described above. As the result, in the liquid crystal devices by use of crossed rubbing axes with crossing angles of −45° and −20°, no twisted angle δ of liquid crystal molecule relative to the normal line of the upper and lower substrate was observed, but the liquid crystal molecule axes adjacent to the upper and lower substrate were found to be parallel to each other. Besides, in the liquid crystal devices by use of crossed rubbing axes with crossing angles of −45° and −20°, the tilt angle $\theta'$ in Table 4-1 could be maintained even when the rectangular pulses for driving of +20 volt and −20 volt were continued to be applied alternately at 1 msec. The transmittance was found to be about 17% in each case.

EXAMPLE 4-3

A liquid crystal cell was prepared according to entirely the same procedure as in Example 4-1 except for changing the 1 μm pitch polymerized pattern of the alignment control film used in the 1.8 μm cell in Example 4-1 to 2 μm pitch, and then the tilt angle θ and the transmittance in the liquid crystal cell were measured. As the result, the tilt angle θ was 12°, and the transmittance was about 10–11%.

EXAMPLE 4-4 to 4-7

Liquid crystals were prepared according to entirely the same procedure as in Example 4-1, except for using the coated films subjected to pattern polymerization treatment shown below in Table 4-2 in place of the alignment control film used in the 1.8 μm cell in Example 4-1, and then the tilt angle θ and the transmittance in each liquid crystal cell were measured. The results are shown in Table 4-2.

TABLE 4-2

| Example | Coated films used in alignment control film | Tilt angle ($\theta$) | Transmittance |
|---|---|---|---|
| 4-4 | $CH_2=CH(CH_2)_{20}COOCH_2CH=CH_2$ | 14° | 12% |
| 4-5 | $CH_2=CH(CH_2)_{20}OCOC(CH_3)=CH_2$ | 14° | 12% |
| 4-6 | $CH_3(CH_2)_{11}C\equiv C-C\equiv C(CH_2)_8COOH$ | 10° | 9% |
| 4-7 | $CH_3(CH_2)_{11}C\equiv C-C\equiv C(CH_2)_8OCOC(CH_3)=CH_2$ | 12° | 11% |

EXAMPLE 5-1

Two 0.7 mm thick glass plates were prepared, and ITO electrodes of 1000 Å were formed on each glass plate.

This ITO electrode substrate was subjected to rubbing treatment, wherein the rubbing axes were determined so that the uniaxial orientation axes of the respective alignment control films became in parallel to each other when assembled into a cell. The ITO electrode substrate was held so that said rubbing axes became vertical or substantially vertical to the water surface of the monomolecular film forming device.

Subsequently, following the same procedure as in Example 3-1, ω-tricosenic acid was dissolved in chloroform and a polymerizable monomolecular built-up film was formed. Also, a cell was assembled in the same manner as in Example 3-1. Then, with injection of the same mixed liquid crystal as used in Example 1-1, the same experiment were conducted. As the result, the tilt angle in the 1.8 μm cell was found to be 14°, with the transmitted light quantity in the lightest state being 12%. The twisted angle δ in the 3.0 μm cell was 4–6°.

EXAMPLE 5-2

Liquid crystal cells were prepared according to the same method as in Example 5-1 except for rubbing axes being made crossed at angles of 45° and 20° in the negative direction (−) in place of the parallel rubbing axes used in the 1.8 μm cell in Example 5-1.

When the tilt angles of these liquid cells were measured, each of them was found to be 14°. It has been found in these liquid crystal cells that although SmA exists on the higher temperature side of SmC*, the optical axis of SmA exists on the bisector of the angle formed by the crossed rubbing axis.

Subsequently, on the two kinds of liquid crystal cells as described above were respectively applied high electrical field alternate currents of a voltage of 70 volt and a frequency of 70 Hz for about 5 minutes angles θ' were measured. The results are shown in the Table 5-1 shown below.

TABLE 5-1

| Crossing angle of rubbing axes | −45° | −20° |
|---|---|---|
| Tilt angle θ' | 14° | 14° |

For these two kinds of liquid crystal cells, the twisted angle δ shown in FIG. 4 was measured according to the same method as in measurement of the twisted angle δ in the liquid crystal device of the 3 μm cell as described above. As the result, in the liquid crystal devices by use of crossed rubbing axes with crossing angles of −45° and −20°, no twist angle δ of liquid crystal molecule relative to the normal line of the upper and lower substrate was observed, but the liquid crystal molecule axes adjacent to the upper and lower substrate were found to be parallel to each other. Besides, in the liquid crystal devices by use of crossed rubbing axes with crossing angles of −45° and −20°, the tilt angle θ' in Table 5-1 could be maintained even when the rectangular pulses for driving of +20 volt and −20 volt were continued to be applied alternately at 1 msec. The transmittance was found to be about 17% in each case.

EXAMPLE 5-3

In place of the transparent electrode substrate equipped with grooves used in the 1.8 μm cell in Example 5-1, used was a transparent electrode substrate prepared by forming on an ITO electrode a coating film with a 3.5% by weight of N-methyl-2-pyrrolidone solution of a polyamic acid obtained by dehydrating condensation reaction of 3,3',4,4'-diphenyltetracarboxylic anhydride and p-phenylenediamine at 1 : 1 molar ratio, followed by dehydrating ring closure to form a polyimide coated film and applying rubbing treatment on the polyimide coating film. Following otherwise the same procedure as in Example 5-1, two layers of ω-tricosenic acid . were built up and polymerized. Then, according to entirely the same procedure as in Example 5-1, a liquid crystal cell was prepared. The tilt angle θ and the transmittance in this liquid crystal cell were measured according to the same method as in Example 5-1. The tilt angle θ was 13° and the transmittance was 12%.

EXAMPLE 5-4 to 5-7

Liquid crystals were prepared according to entirely the same procedure as in Example 5-1, except for using the coating films shown below in Table 5-2 in place of the alignment control film used in the 1.8 μm cell in Example 5-1, and then the tilt angle and the transmittance at that time in each liquid crystal cell were measured. The results are shown in Table 5-2.

TABLE 5-2

| Example | Coated films used in alignment control film | Tilt angle (θ) | Transmittance |
|---|---|---|---|
| 5-4 | $CH_2=CH(CH_2)_{20}COOCH_2CH=CH_2$ | 14° | 12% |
| 5-5 | $CH_2=CH(CH_2)_{20}OCOC(CH_3)=CH_2$ | 13° | 11% |
| 5-6 | $CH_3(CH_2)_{11}C\equiv C-C\equiv C(CH_2)_8COOH$ | 10° | 9% |
| 5-7 | $CH_3(CH_2)_{11}C\equiv C-C\equiv C(CH_2)_8OCOC(CH_3)=CH_2$ | 11° | 11% |

EXAMPLE 6-1

A substrate having ITO electrodes with film thickness of 1000 Å formed according to the lift-off method in the same manner as in Example 2-1 was employed.

Subsequently, following the same procedure as in Example 3-1, ω-tricosenic acid was dissolved in chloroform and a polymerizable monomolecular built-up film was formed. A cell was assembled in the same manner as in Example 3-1. Then, with injection of the same mixed liquid crystal as used in Example 1-1, the same experiment were conducted. As the result, the tilt angle in the 1.8 μm cell was found to be 14°, with the transmitted light quantity in the lightest state being 13%. Also, the twist angle ι in the 3.0 μm cell was 4–5°.

EXAMPLE 6-2

Liquid crystal cells were prepared according to the same methods as in Example 1 except for using rubbing axes crossed at angles of 45° and 20° in the negative direction (−) in place of the parallel rubbing axes used in the 1.8 μm cell in Example 6-1.

The tilt angles of these liquid cells were measured, and each of them was found to be 14°. It has been found in these liquid crystal cells that although SmA exists on the higher temperature side of SmC*, the optical axis of SmA exists on the bisector of the angle formed by the crossed rubbing axis.

Subsequently, on the two kinds of liquid crystal cells as described above were respectively applied high electrical field alternate currents of a voltage of 70 volt and a frequency of 70 Hz for about 5 minutes (alternate current application pretreatment). The tilt angles θ' were measured. The results are shown in the Table 6-1 shown below.

TABLE 6-1

| Crossing angle of rubbing axes | −45° | −20° |
|---|---|---|

TABLE 6-1-continued

| Tilt angle θ' | 14° | 14° |

For these two kinds of liquid crystal cells, the twist angle δ shown in FIG. 4 was measured according to the same method as in measurement of the twisted angle δ in the liquid crystal device of the 3 μm cell as described above. As the result, in the liquid crystal devices by use of crossed rubbing axes with crossing angles of −45° and −20°, no twisted angle δ of liquid crystal molecule relative to the normal line of the upper and lower substrate was observed, but the liquid crystal molecule axes adjacent to the upper and lower substrate were found to be parallel to each other. Besides, in the liquid crystal devices by use of crossed rubbing axes with crossing angles of −45° and −20°, the tilt angle θ' in Table 6-1 could be maintained even when . the rectangular pulses for driving of +20 volt and −20 volt were continued to be applied alternately at 1 msec. The transmittance was found to be about 17% in each case.

EXAMPLE 6-3 to 6-6

Liquid crystals were prepared according to entirely the same procedure as in Example 6-1, except for using the coated films shown below in Table 6-2 in place of the alignment control film used in the 1.8 μm cell in Example 6-1. The tilt angle θ and the transmittance at that time in each liquid crystal cell were measured. The results are shown in Table 6-2.

TABLE 6-2

| Example | Coated films used in alignment control film | Tilt angle (θ) | Transmittance |
|---|---|---|---|
| 6-3 | $CH_2=CH(CH_2)_{20}COOCH_2CH=CH_2$ | 14° | 12% |
| 6-4 | $CH_2=CH(CH_2)_{20}OCOC(CH_3)=CH_2$ | 14° | 12% |
| 6-5 | $CH_3(CH_2)_{11}C≡C—C≡C(CH_2)_8COOH$ | 10° | 9% |
| 6-6 | $CH_3(CH_2)_{11}C≡C—C≡C(CH_2)_8OCOC(CH_3)=CH_2$ | 12° | 11% |

COMPARATIVE EXAMPLE 1-1

A liquid crystal cell was prepared according to entirely the same procedure as in Example 1-1, except for using a polyimide coated film formed by subjecting a coated film with a 3.5% by weight of N-methyl-2-pyrrolidone solution of a polyamic acid obtained by dehydrating condensation reaction of 3,3′,4,4′diphenyltetracarboxylic anhydride and p-phenylenediamine at 1 : 1 molar ratio to dehydrating ring closure and then subjecting the polyimide coated film to rubbing treatment in place of the alignment control film used in preparation of the 1.8 μm cell in Example 1-1.

The tilt angle θ and the transmittance in this liquid cell were measured according to the same methods as in Example 1-1. The tilt angle θ was found to be 6°-8°, and the transmittance at the time about 3 to 5%. Thus, in this comparative cell, the tilt angle under the memory state realized in the bistable chiral smectic phase is small, and its transmittance is entirely insufficient to be applied for a display device.

COMPARATIVE EXAMPLE 1-2

A liquid crystal cell was prepared according to entirely the same procedure as in Example 1-1, except for using a polyimide coated film formed by subjecting a coated film with a 3.5% by weight of N-methyl-2-pyrrolidone solution of a polyamic acid obtained by dehydrating condensation reaction of 3,3′,4,4′diphenyltetracarboxylic anhydride and 4,4′-diaminodiphenyl at 1 : 1 molar ratio to dehydrating ring closure and then subjecting the polyimide coated film to rubbing treatment in place of the alignment control film used in preparation of the 1.8 μm cell in Example 1-1.

The tilt angle θ and the transmittance in this liquid cell were measured according to the same methods 6°-7°, and the transmittance at that time about 3 to 4%.

COMPARATIVE EXAMPLE 1-3

A liquid crystal cell was prepared according to entirely the same procedure as in Example 1-1, except for using a polyimide coated film formed by subjecting a coated film with a 3.5% by weight of N-methyl-2-pyrrolidone solution of a polyamic acid obtained by diphenyltetracarboxylic anhydride and 4,4′-diaminoterphenyl at 1 : 1 molar ratio to dehydrating ring closure and then subjecting the polyimide coated film to rubbing treatment in place of the alignment control film used in preparation of the 1.8 μm cell in Example 1-1.

The tilt angle θ and the transmittance in this liquid cell were measured according to the same methods as in Example 1-1. The tilt angle θ was found to be 5°-7°, and the transmittance at the time about 3 to 4%.

EFFECT OF THE INVENTION

According to the alignment control with the liquid crystal device of the present invention, it has the first effect in the point that a monodomain of a ferroelectric liquid crystal, particularly a ferroelectric liquid crystal having at least tow stable states obtained by a non-helical structure, can be obtained, and further has the second excellent effect in the point that the tilt angle θ under at least the two stable states exhibited by the non-helical structure of the ferroelectric liquid crystal, particularly under the bistable state (namely, under the memory state) can be increased.

We claim:

1. A ferroelectric liquid crystal device comprising a pair of substrates, a ferroelectric liquid crystal arranged therebetween and an alignment-controlling film arranged on tehliquid crystal side surface of at least one of hte substates, said alignment-controlling film being a polyimide monomolecular film or a monomolecular-built-up film thereof obtained by dehydrating ring closure of a monomolecular or monomolecular-built-up film of a polyamic acid.

2. The ferroelectric liquid crystal device according to claim 1, wherein said dehydrating ring closure is caused by acid or heat treatment.

3. A ferroelectic liquid crystal device comprising a pair of substrates, a ferroelectric liquid crystal sandwiched therebetween and an alignment-controlling film arranged on the liquid crystal side surface of at least one of the substrates, said alignment-controlling film being a film prepared by polymerizing a monomolecular film of a compound represented by $R_1—(CH_2)_n—X—R_2$ or monomolecular-built-up film thereof, wherien X is CONH, or OCO; $R_1$ is $CH_3—$, or $CH_2=CH—$; $R_2$ is H, —CH=CH$_2$, —C(CH$_3$)=CH$_2$, or —CH$_2$CH=CH$_2$; and 10≦n≦25.

4. A ferroelectric liquid crystal device comprising a pair of substraes, a ferroelectric liquid crystal sandwiched between the substrates and an alignment-controlling film bringing the tilt angle Θ of hte ferroelecti liquid crystal at a non-helical structure to at least 10° arranged on the liquid crystal side surface of at least one of the substrates, said alignment-controlling film being a monomolecular film or monomolecular-built-up Langmuir-Blodgette process film of a compound having both hydrophilic anc hydrophobic portions within the monomer unit of the polymer, the substraes being arranged such that the helical structure of he ferroelectric liquid crystal is loosened.

5. A ferroelectric liquid crystal device according to claim 4, wherein said alignment-controlling film is obtained by further dehydrating the enclosure of the monomolecular or monomolecular-built-up film.

6. A ferroelectric liquid crystal device acacoridng to claim 4, wherein said alignment-controlling film is prepared by polymerizing the monomolecular or monomolecular-built-up film.

7. A ferroelectric liquid crystal device according to claims 3 or 4 wherein siad ferroelectric liuquid crystal has at least tow stable states.

8. The ferroelectric liquid crystal device accoring to claims 1 or 4 wherein siad alignment-controlling film has been subjected to rubbing treatment.

9. The ferroelectric liquid crystal device according to claims 1 or 4 wherein said alignment-controlling film has been subjected to rubbing treatment.

10. The ferroelectric liquid crystal device according to claim 9 wherein the alignment treatment applied to the surface of the substrate is rubbing treatment.

11. The ferroelectric liquid crystal device according to claim 9 wherein the alignment treatment applied on the surface of the substrate is formation of fine grooves.

* * * * *

UNITED STATES PATENT AND TRADEMARK OFFICE
CERTIFICATE OF CORRECTION

PATENT NO. : 5,009,489
DATED : April 23, 1991
INVENTOR(S) : KEN EGUCHI ET AL.

It is certified that error appears in the above-identified patent and that said Letters Patent is hereby corrected as shown below: ON TITLE PAGE:

AT [56] REFERENCES CITED

Other Publications, "Mondayer" should read --Monolayer--.

Insert, --*Attorney, Agent or Firm*--Fitzpatrick, Cella, Harper & Scinto--.

AT [57] ABSTRACT

"monomecular" should read --monomolecular--.

AT [73] ASSIGNEE

Insert, --[73] Assignee: Canon Kabushiki Kaisha, Tokyo, Japan--.

COLUMN 1

Line 65, "below" should read --below)--.

COLUMN 2

Line 4, "angle $\eta$" should read --angle $\theta$--.
Line 12, "a" should read --as--.
Line 16, "structure" should read --structure than the tilt angle--.
Line 45, "angle 0" should read angle $\theta$--.

COLUMN 3

Line 16, "crysta" should read --crystal--.
Line 49, "a" should read --as--.

UNITED STATES PATENT AND TRADEMARK OFFICE
CERTIFICATE OF CORRECTION

PATENT NO. : 5,009,489
DATED : April 23, 1991
INVENTOR(S) : KEN EGUCHI ET AL.

It is certified that error appears in the above-identified patent and that said Letters Patent is hereby corrected as shown below:

COLUMN 5

Line 10, "passion" should read --fashion--.
Line 35, "constitutent" should read --constituent--.
Line 37, "an" should be deleted.
Line 44, "indivicu-" should read --individu---.
Line 52, "groups" should be deleted.

COLUMN 6

Line 2, "o" should read --or--.
Line 9, "b" should read --by--.
Line 12, "gultamate" should read --glutamate--.
Line 13, "gultamate" should read --glutamate--.

COLUMN 7

Line 11, "hydropholic" should read --hydrophilic--.
Line 13, "groups" (1st occurrence) should be deleted.
Line 15, "in" should be deleted.
Line 38, "Langumir-Blodgett" should read --Langmuir-Blodgett--.
Line 49, "on" should read --,--.
Line 57, "mono molecu-" should read --monomolecu---.

COLUMN 8

Line 22, "compound" should read --compound has--.
Line 39, align right margin.
Line 40, align left margin.

UNITED STATES PATENT AND TRADEMARK OFFICE
CERTIFICATE OF CORRECTION

PATENT NO. : 5,009,489

DATED : April 23, 1991

INVENTOR(S) : KEN EGUCHI ET AL.

It is certified that error appears in the above-identified patent and that said Letters Patent is hereby corrected as shown below:

COLUMN 9

Line 40, "exhibits" should read --exhibit--.
Line 41, "about" should be deleted.
Line 53, "1 μto" should read --1 μ to--.
Line 58, "Example" should read --Examples--.

COLUMN 10

Line 38, "in" should read --an--.
Line 41, "title" should read --tilt--.
Line 65, "ma" should read --may--.

COLUMN 11

Line 24, "the" (3rd occurrence) should be deleted.
Line 30, "made" should read --made into--.
Line 39, "example." should read --examples.--.
Line 43, "glass" should read --glass plate.--.

COLUMN 12

Line 7, "state" should read --from the state--.
Line 48, "correspond" should read --corresponds--.
Line 52, "not" should read --than that--.
Line 65, "spacerin" should read --spacer in--.

COLUMN 13

Line 13, "b" should read --be--.
Line 68, "signals (2nd occurrence) should read --signals.--..

UNITED STATES PATENT AND TRADEMARK OFFICE
CERTIFICATE OF CORRECTION

PATENT NO. : 5,009,489
DATED : April 23, 1991
INVENTOR(S) : KEN EGUCHI ET AL.

It is certified that error appears in the above-identified patent and that said Letters Patent is hereby corrected as shown below:

COLUMN 14

Line 56, "tound" should read --found--.

COLUMN 15

Table 1-2, "Examples 1-8." should read --Example 1-8.--.
Line 47, "by." should read --by--.

COLUMN 16

Line 2, "The" (1st occurrence) should read --In the-- and "the" (2nd occurrence) should read --the twisted angle $\delta$ was 5-6°.--.
Line 38, "uppe" should read --upper--.
Line 41, "angle $\theta$" should read --angle $\theta'$--.
Line 48, "the" should be deleted.

COLUMN 17

Line 10, "EXAMPLE" should read --EXAMPLES--.
Line 17, "Angle 0" should read --angle $\theta$--.
Line 42, "KHCO." should read --$KHCO_3$.--.
Line 53, "Lc" should read --L$\alpha$--.
Line 56, "film thickness" should read --film polymerized at this time was found to have a film thickness--.

UNITED STATES PATENT AND TRADEMARK OFFICE
CERTIFICATE OF CORRECTION

PATENT NO. : 5,009,489
DATED : April 23, 1991
INVENTOR(S) : KEN EGUCHI ET AL.    Page 5 of 7

It is certified that error appears in the above-identified patent and that said Letters Patent is hereby corrected as shown below:

COLUMN 18

Line 43, "line" should read
--relative to the normal line--.
Line 55, "EXAMPLE" should read --EXAMPLES--.

COLUMN 19

Line 15, "Le" should read --L$\alpha$--.
Line 26, "wa" should read --was--.
Line 29, "thetilt" should read --the tilt--
and "inthe" should read --in the--.
Line 42, "was" should read --were--.
Line 55, "axis." should read --axes.--.

COLUMN 20

Line 16, "strate" should read --strates--.
Line 17, "substrate" should read --substrates--.
Line 35, "EXAMPLE" should read --EXAMPLES--.

COLUMN 21

Line 29, "axis." should read --axes.--.
Line 33, "minutes angles $\theta'$" should read --minutes
(alternate current application pretreatment).
The tilt angles $\theta$--.

UNITED STATES PATENT AND TRADEMARK OFFICE
CERTIFICATE OF CORRECTION

PATENT NO. : 5,009,489
DATED : April 23, 1991
INVENTOR(S) : KEN EGUCHI ET AL.

Page 6 of 7

It is certified that error appears in the above-identified patent and that said Letters Patent is hereby corrected as shown below:

COLUMN 22

Line 5, "acid." should read --acid--.
    Line 13, "EXAMPLE" should read --EXAMPLES--.
    Line 44, "angle ι" should read --angle δ--.
    Line 57, "axis." should read --axes.--.

COLUMN 23

Line 18, "when." should read --when--.
    Line 23, "EXAMPLE" should read --EXAMPLES--.
    Line 46, "3,3',4,4'diphenyltet-" should read
           --3,3',4,4'-diphenyltet---.
    Line 67, "3,3',4,4'diphenyltet-" should read
           --3,3',4,4'-diphenyltet---.

COLUMN 24

Line 6, "methods" should read --methods as in
          Example 1-1. The tilt angle θ was
          found to be--.
    Line 14, "by" should read --by dehydrating
          condensation reaction of 3,3',4,4'---.
    Line 30, "tow" should read --two--.
    Line 51, "tehliquid" should read --the liquid--.
    Line 52, "hte" should read --the--.
    Line 60, "ferroelectic" should read --ferroelectric--.
    Line 67, "wherien" should read --wherein--.

UNITED STATES PATENT AND TRADEMARK OFFICE
CERTIFICATE OF CORRECTION

PATENT NO. : 5,009,489

DATED : April 23, 1991

INVENTOR(S) : KEN EGUCHI ET AL.

Page 7 of 7

It is certified that error appears in the above-identified patent and that said Letters Patent is hereby corrected as shown below:

COLUMN 25

Line 4, "substraes," should read --substrates,--.
    Line 7, "hte ferroelecti" should read
        --the ferroelectric--.
    Line 11, "Langmuir-Blodgette" should read
        --Langmuir-Blodgett--.
    Line 12, "anc" should read --and--.
    Line 13, "substraes" should read --substrates--.
    Line 14, "he" should read --the--.

COLUMN 26

Line 1, "acacoridng" should read --according--.
    Line 6, "siad" should read --said--
        and "liuquid" should read --liquid--.
    Line 7, "tow" should read --two--.
    Line 8, "accoring" should read --according--.
    Line 9, "siad" should read --said--.

Signed and Sealed this

Twenty-eighth Day of January, 1992

Attest:

HARRY F. MANBECK, JR.

Attesting Officer        Commissioner of Patents and Trademarks

UNITED STATES PATENT AND TRADEMARK OFFICE
CERTIFICATE OF CORRECTION

PATENT NO. : 5,009,489
DATED : April 23, 1991
INVENTOR(S) : KEN EGUCHI, ET AL.

It is certified that error appears in the above-identified patent and that said Letters Patent is hereby corrected as shown below:

COLUMN 24

Line 52, "substates," should read --substrates,--.

COLUMN 26

Line 6, "claims 3 or 4" should read --claim 1, 3 or 4,--.
Line 9, "claims 1 or 4" should read --claim 1, 3 or 4,--.
Line 12, "claims 1 or 4" should read --claim 1, 3 or 4,-- and "said alignment-controlling film" should read --the surface of said substrate--.
Line 15, "claim 9" should read --claim 9,-- and "the" should read --said--.
Line 16, "the" (second occurrence) should read --said--.
Line 18, "claim 9" should read --claim 9,-- and "the" should read --said--.
Line 19, "the" (second occurrence) should read --said-- and "formation" should read --a formation--.

Signed and Sealed this

Fifteenth Day of March, 1994

Attest:

BRUCE LEHMAN

Attesting Officer     Commissioner of Patents and Trademarks